United States Patent [19]

Henri et al.

[11] Patent Number: 4,740,789

[45] Date of Patent: Apr. 26, 1988

[54] METHOD FOR OPTIMIZING THE STORAGE OF VIDEO SIGNALS IN A DIGITAL SCAN CONVERTER, AND A DIGITAL SCAN CONVERTER USING SAID METHOD

[75] Inventors: Jean-Claude Henri, Boulogne Billancourt; Jean-Pierre Andrieu, Paris; Dominique Gault, Ville D'Avray, all of France

[73] Assignee: Thomson-CSF, Paris, France

[21] Appl. No.: 8,908

[22] Filed: Jan. 30, 1987

[30] Foreign Application Priority Data

Jan. 31, 1986 [FR] France ............................ 86 01377
Apr. 4, 1986 [FR] France ............................ 86 04860

[51] Int. Cl.$^4$ .......................................... G01S 7/04
[52] U.S. Cl. ...................................... 342/185; 358/140
[58] Field of Search ............... 342/185, 195; 358/140; 367/11

[56] References Cited

U.S. PATENT DOCUMENTS

| | | | |
|---|---|---|---|
| 3,810,174 | 5/1974 | Heard et al. | 342/185 |
| 4,002,827 | 1/1977 | Nevin et al. | 342/185 |
| 4,065,770 | 12/1977 | Berry | 342/185 |
| 4,128,838 | 12/1978 | Brands et al. | 342/185 |
| 4,214,269 | 7/1980 | Parker et al. | 358/140 |
| 4,387,365 | 6/1983 | Berry et al. | 358/140 X |
| 4,443,797 | 4/1984 | Cramp et al. | 342/185 |
| 4,580,164 | 4/1986 | Andrieu et al. | 358/140 |

FOREIGN PATENT DOCUMENTS

| | | | |
|---|---|---|---|
| 0068852 | 1/1983 | European Pat. Off. | 342/185 |
| 0099832 | 2/1984 | European Pat. Off. | 342/185 |
| 0047040 | 11/1980 | United Kingdom | |

OTHER PUBLICATIONS

Leavitt, S. "A Scan Conversion Algorithm for Displaying Ultrasound Images", 1266 Hewlett Packard Journal, vol. 34, (1083), Oct., No. 10.

*Primary Examiner*—Theodore M. Blum
*Assistant Examiner*—Bernarr Gregory
*Attorney, Agent, or Firm*—Pollock, VandeSande & Priddy

[57] ABSTRACT

A method for optimizing the storage of video signals in a digital scan converter provided with an intermediate block memory provided between the radial memory and the image memory. In the block memory, the pixels to be displayed are grouped together in blocks, the blocks being transferred in parallel to the image memory when they are completely filled. The blocks of the block memory correspond to those of the image memory and can each be used several times during a single antenna revolution.

17 Claims, 10 Drawing Sheets

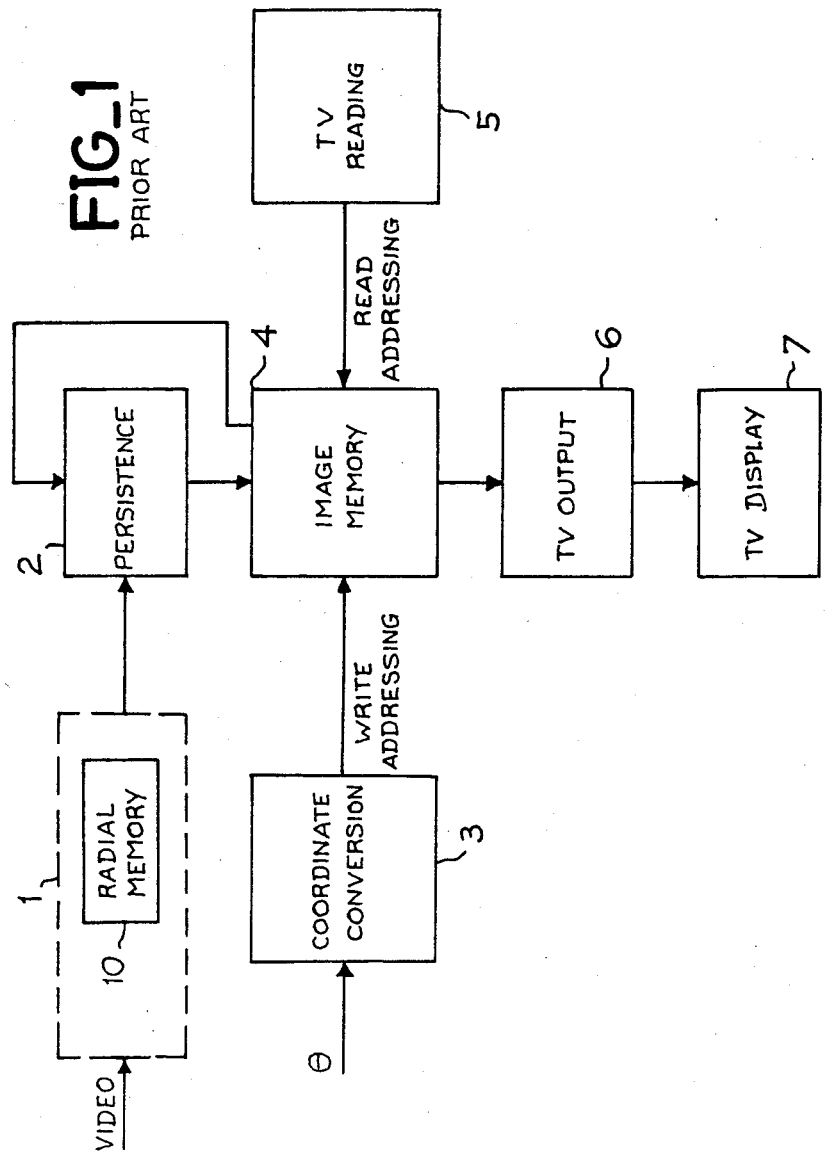
FIG_1 PRIOR ART

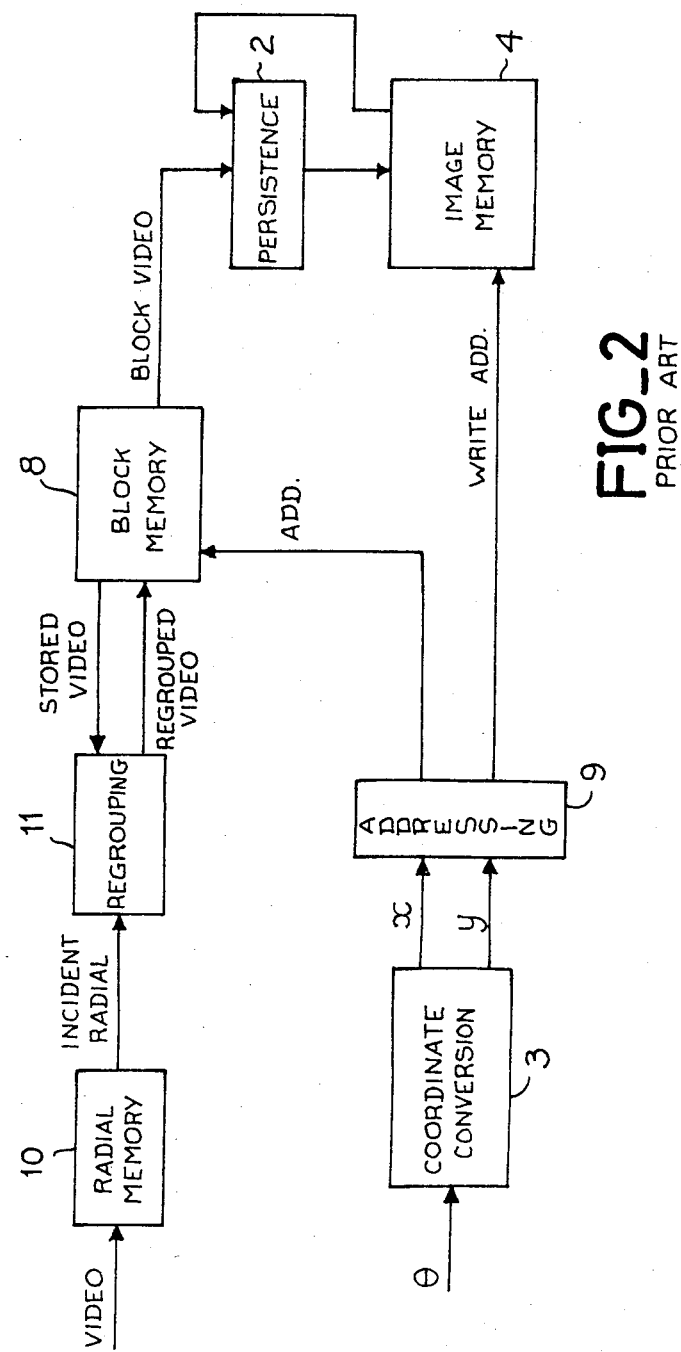
FIG_2 PRIOR ART

FIG_3
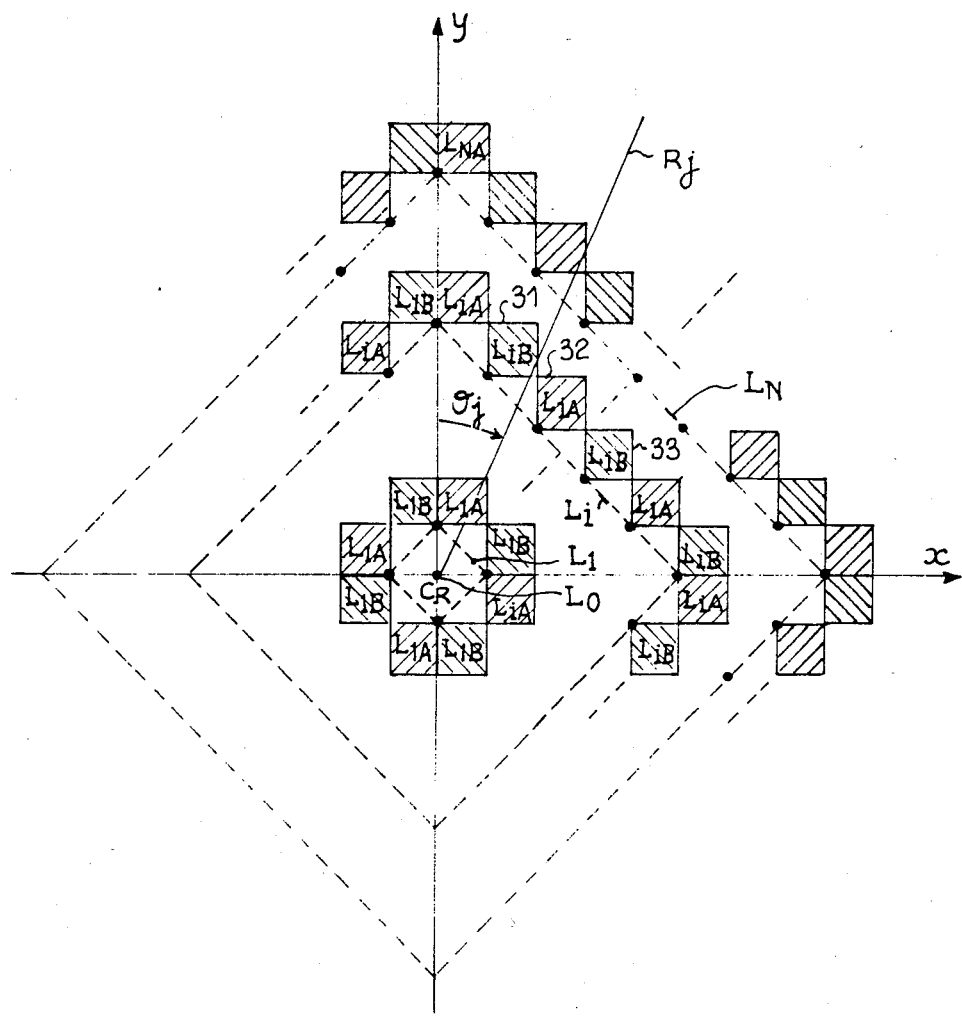

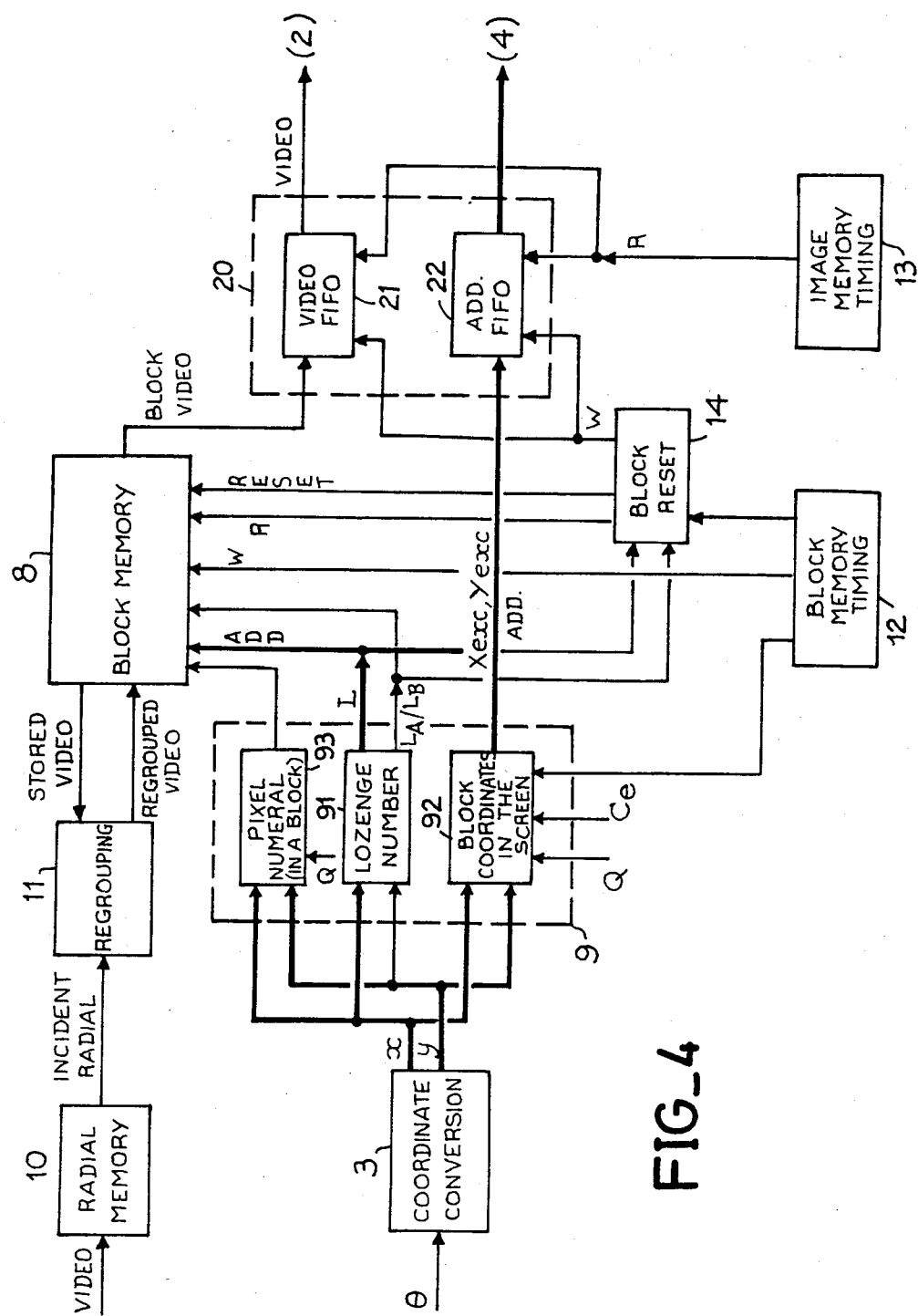
FIG_4

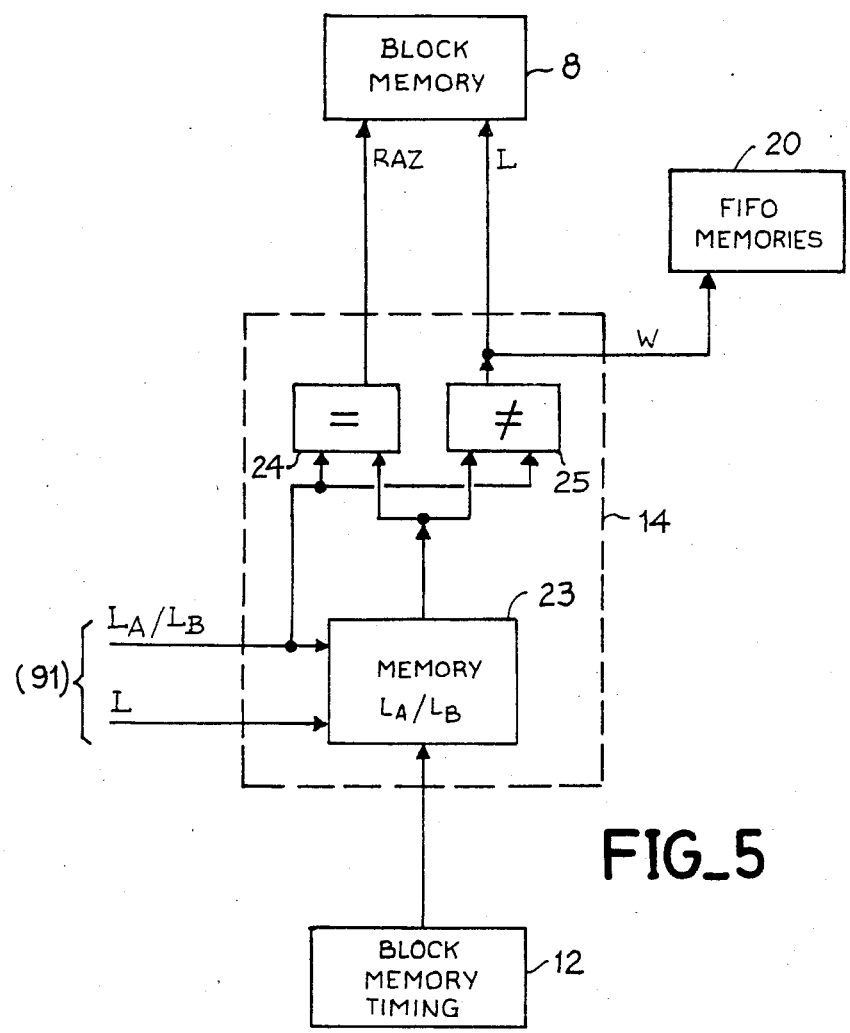
FIG_5

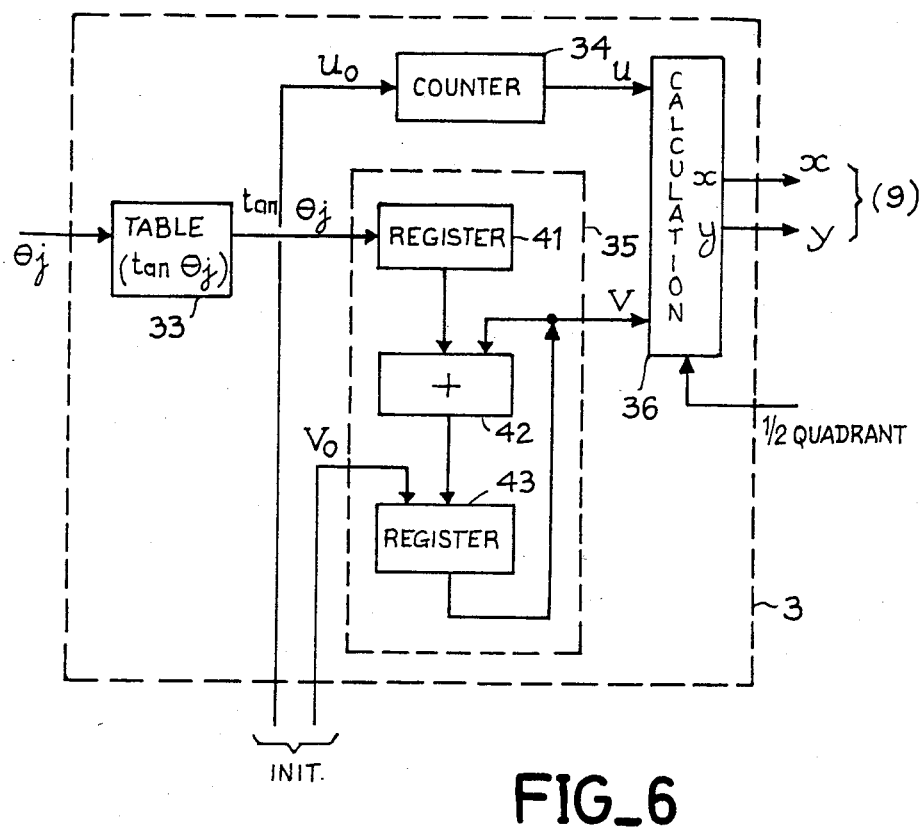
FIG_6

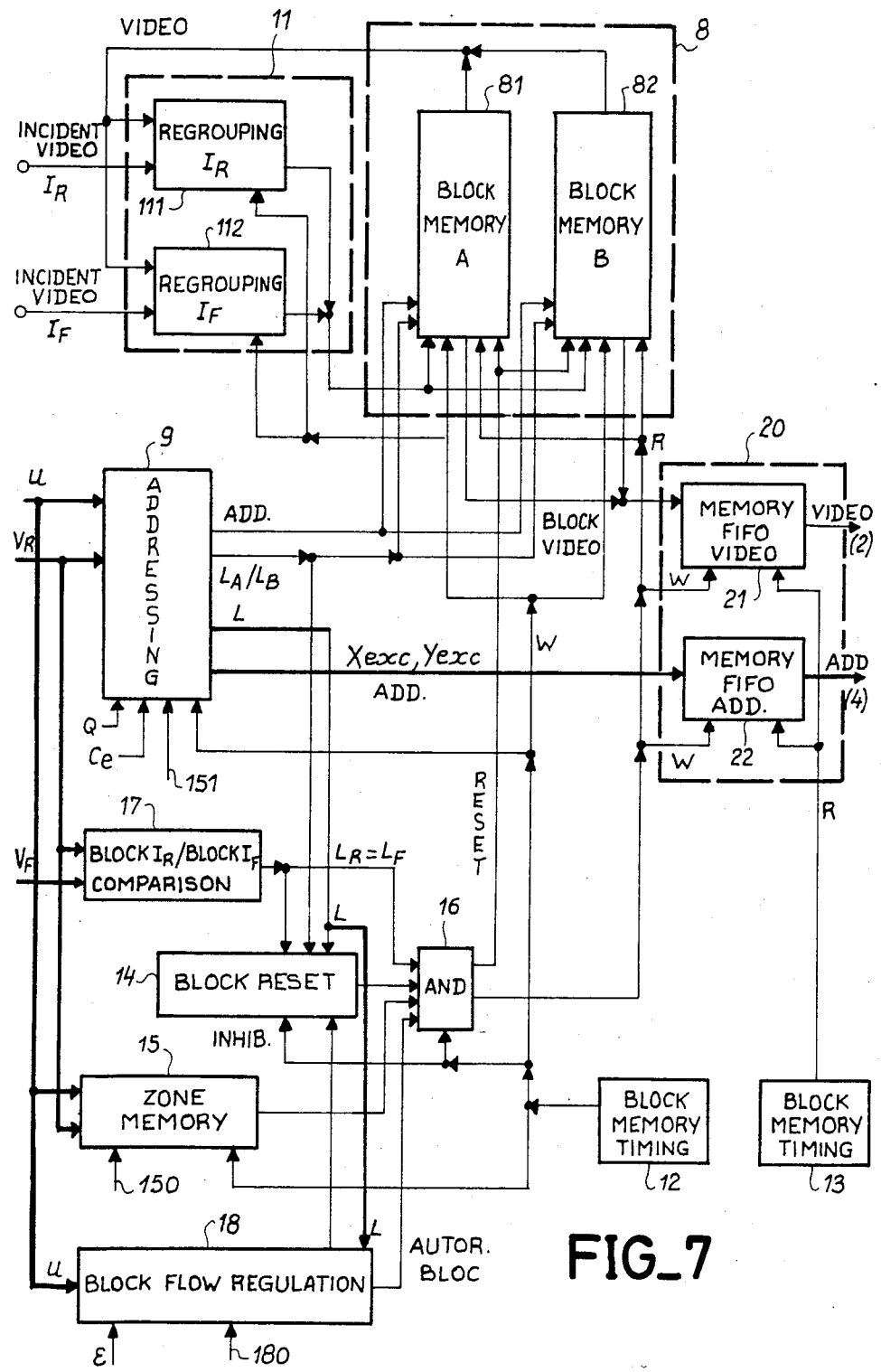
FIG_7

FIG_8-a
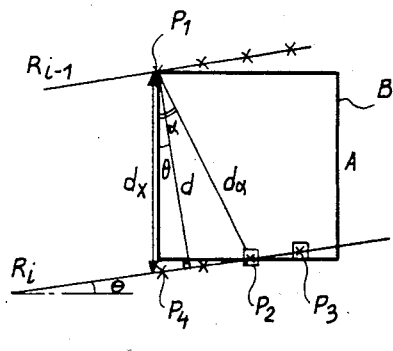
FIG_8-b
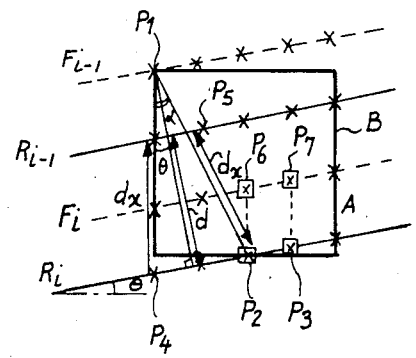
FIG_9
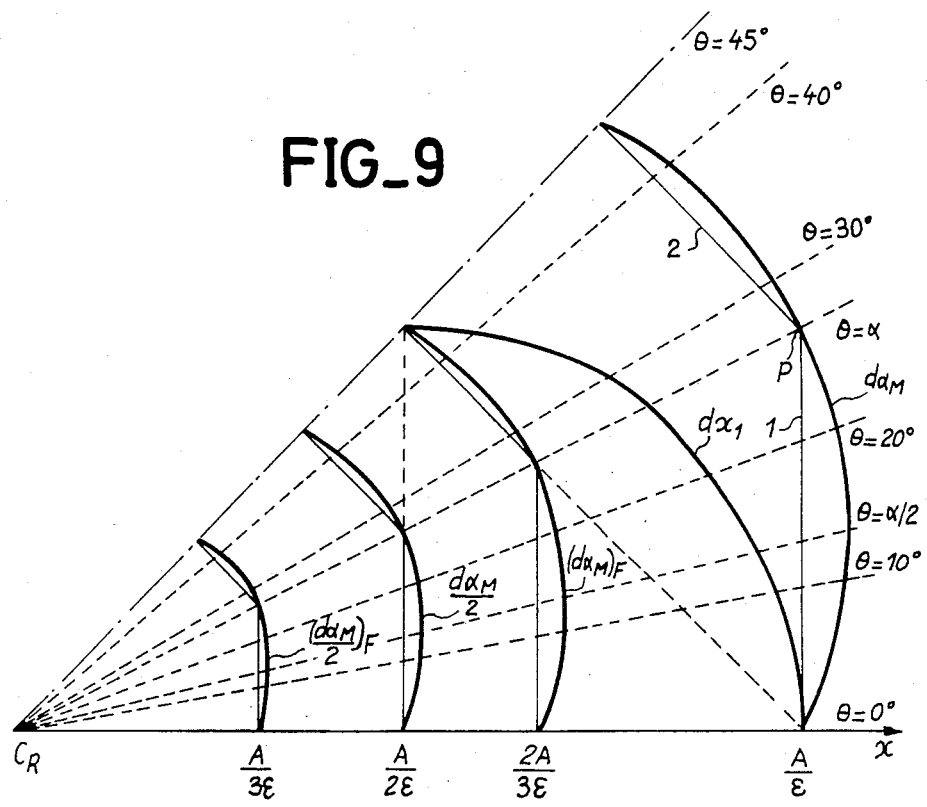

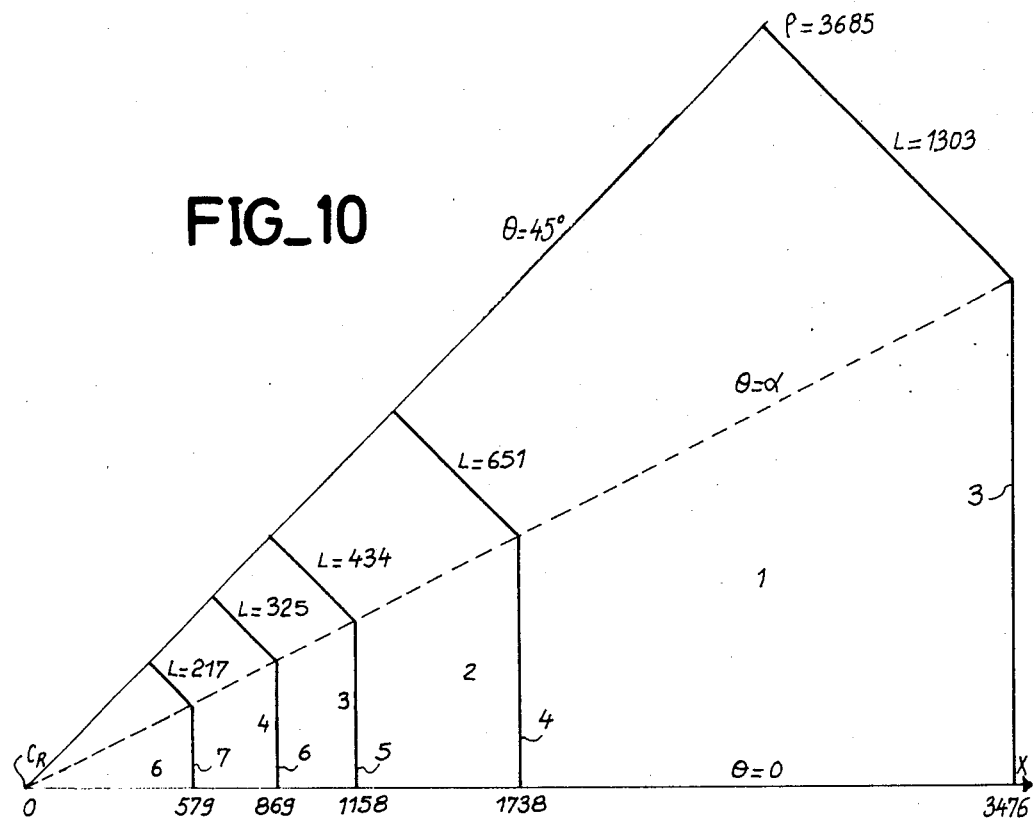
FIG_10
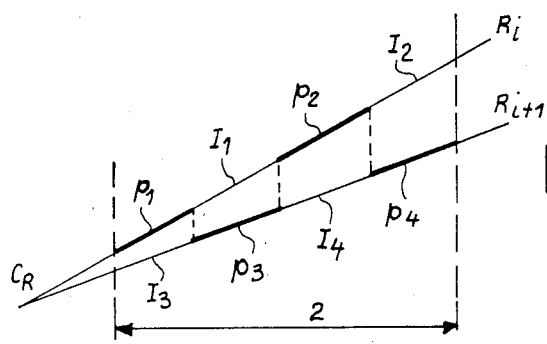
FIG_11a
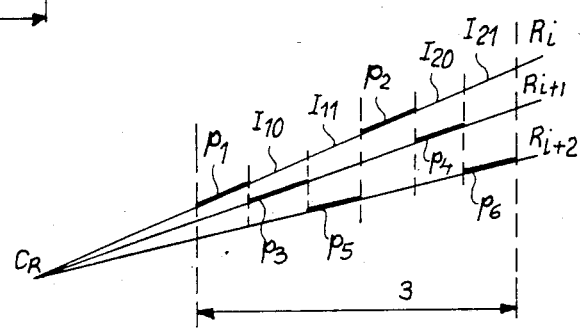
FIG_11b

FIG_12
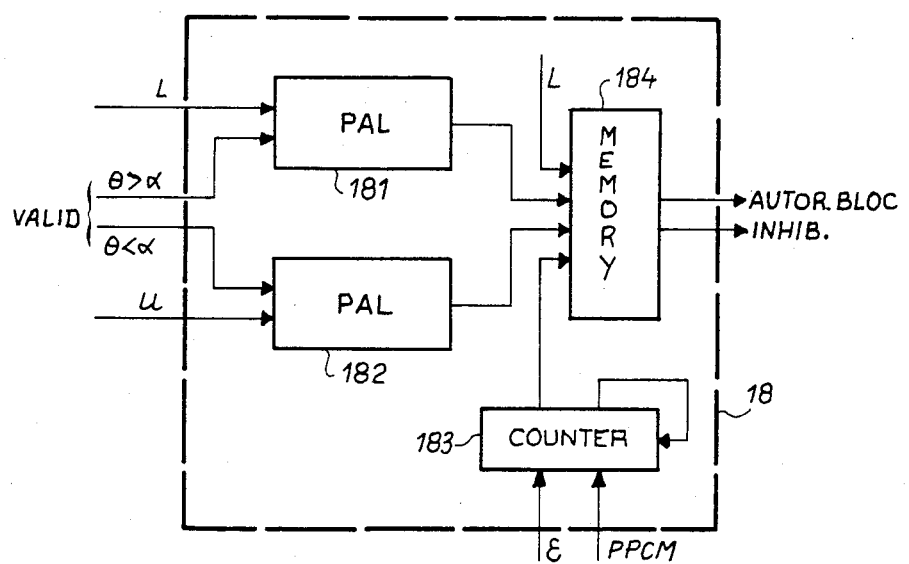

METHOD FOR OPTIMIZING THE STORAGE OF VIDEO SIGNALS IN A DIGITAL SCAN CONVERTER, AND A DIGITAL SCAN CONVERTER USING SAID METHOD

BACKGROUND OF THE INVENTION

1. Field of the Invention

The present invention concerns a method for optimizing the storage of video signals in a digital scan converter. A further object of the invention is to provide a digital scan converter (DSC) using said method.

2. Description of the Prior Art

It is recalled that a DSC is a device which receives video information expressed in polar coordinates and permits display on a screen which is scanned in the television mode. By way of example, the information under consideration can be the video signal received by a radar system. This signal is received from each successive direction of the radar antenna, said directions being located angularly ($\theta_i$) with respect to a reference direction (usually north). The signal is displayed along the radii of a single circle, the center of which is the so-called radar center. The information thus displayed on one radius is referred to as a "radial". In order to perform this function, a DSC includes the following:

Means for digitizing the received information.

An image memory storing the digitized information, which contains at each instant the image as it is to be displayed on the screen. A predetermined number of bits of this memory is assigned to each of the screen picture elements known as pixels and considered as separate and distinct from each other.

Means for coordinate conversion. This is required since the location of an item of information to be displayed on a television screen has to be expressed in cartesian coordinates.

Artificial persistance circuits which cause aging of the stored information in accordance with a predefined law.

When the quantity of data to be displayed becomes substantial, as is the case for example with high rotational velocity of the radar antenna, a problem arises in regard to image memory access times. This memory must in fact have a large capacity, which precludes the use of very high-speed memories on economic grounds. The memory access load is as follows:

memory readout at a rate imposed by the television screen;

memory refreshment usually imposed by the technologies employed for high-capacity memories;

writing of the video signal in the memory.

Furthermore, in a DSC the conversion process takes place along the radials and, in the vicinity of the radar center, it is observed that the converted points are extremely close to each other and often fall on the same pixel, Thus the number of memory accesses is increased. By way of example, in the case of a square screen containing 1024×1024 pixels and in the case of a (centered) image made up of 8192 radials per antenna revolution in which each radial is composed of 512 points, it is apparent that writing of an image requires $8192 \times 512 \neq 4.10^6$ accesses per revolution whereas writing of $1024 \times 1024$ pixels requires in principle only approximately $10^6$ accesses per revolution.

One solution would be to permit access to a number of pixels in parallel for writing in the image memory. However, due to the fact that the incident points do not have a uniform structure with respect to the organization of the memory, the practical realization of such a parallel arrangement is difficult and somewhat cumbersome.

Another solution is to interpose an intermediate memory called block memory between the incident information and the image memory. The organization of this intermediate memory is identical to that of the image memory except for the fact that adjacent pixels are regrouped together in blocks which are transferred in parallel into the image memory when they are completely filled. This makes it possible to reduce the writing load of the image memory.

An object of the present invention is optimization of the dimensioning and organization of a block memory of this type.

SUMMARY OF THE INVENTION

According to the present invention, there is provided a method for optimizing the storage of video signals in a digital scan converter (DSC). The method makes use of a block memory in which:

the pixels will be written as the radar video signal is received and the coordinates converted to a cartesian reference frame;

the block memory is much smaller in size than the image memory and equal at a minimum to 4N blocks if the image memory contains $N^2$ blocks, the same blocks being re-used several times during a single antenna revolution in accordance with the following procedure:

The blocks of the block memory are regrouped together in 2N pairs, one of the blocks of one pair being read in parallel and addressed to the image memory while the other block receives the incident information. Moreover, if consideration is given to the concentric lozenges formed by all the blocks of pixels in the screen, the blocks of any one pair are assigned to any one lozenge as follows: at a given instant, the radial which is being stored in memory passes through a block of pixels of order i in a given lozenge. The corresponding information is written in the first block of the pair which is assigned to said lozenge. In the meantime, the second block of the pair is being read. On completion of the read operation, said second block is available for receiving the information which will be stored in memory when the radials subsequently pass through the following block of pixels of order i+1 of the same lozenge. At this moment, the first block will be read, and so on in sequence.

BRIEF DESCRIPTION OF THE DRAWINGS

FIG. 1 is a block diagram of a prior art DSC.

FIG. 2 is a block diagram of a prior art DSC provided with a block memory.

FIG. 3 is an explanatory diagram of the organization of the block memory in accordance with the invention.

FIG. 4 illustrates a first embodiment of the DSC in accordance with the invention.

FIG. 5 illustrates an embodiment of one of the elements of the previous figure.

FIG. 6 illustrates an embodiment of another element of FIG. 4.

FIG. 7 illustrates an embodiment of the DSC in accordance with the invention and shows an assembly of variants which can be applied independently.

FIGS. 8a and 8b are two explanatory diagrams, concerning one of the variants of FIG. 7.

FIG. 9 is an explanatory diagram relating to the same variant.

FIG. 10 is one example of cutting up the range of the radar into zones.

FIGS. 11a and 11b are two explanatory diagrams relating to the same variant.

FIG. 12 is one embodiment of one of the elements of FIG. 7.

In these different figures, the same references relate to the same elements.

DESCRIPTION OF THE PREFERRED EMBODIMENTS

The DSC shown in the block diagram of FIG. 1 mainly includes the following:

A television monitor 7 on which the radar information is displayed.

An image memory 4 containing in digital form the image to be displayed on the monitor 7.

An assembly 1 of circuits for processing video signals transmitted by the radar system and received by the DSC. This assembly mainly includes a circuit (not shown) for sampling the received analog signal and performing digital conversion of this signal as well as radial memory 10 which contains the different radials in succession. As a general rule, the assembly 1 contains two radial memories which perform alternate read and write operations. For the sake of enhanced simplicity, reference will be made only to the memory 10 throughout the following description. The assembly 1 can be provided in addition with circuits for mixing the incident radar video signals with other signals to be displayed on the screen 7.

A circuit assembly 3 for converting polar coordinates into cartesian coordinates. To this end, said circuit assembly 3 receives the value of the angle $\theta$ and performs write-addressing of the image memory 4 while the assembly 1 delivers via a circuit assembly 2 the video information to be written in the image memory 4 in synchronism with the addressing operation.

An assembly 2 of artificial persistance circuits whose function is therefore to produce a persistence effect for the digital data which are stored in the memory 4 and for which there do not exist any modifications due to aging. Said persistence effect is comparable with the effect produced on a persistent tube in which the brightness of a point begins to decrease as soon as it is written.

An assembly 5 of television-mode read circuits for read-addressing the image memory 4.

An assembly 6 of television-mode output circuits having the functions of receiving the information contained in the image memory 4 as addressed by the circuit assembly 5, of digital-to-analog conversion of said information for generating a television video signal to be transmitted to the monitor 7, and also of generating conventional television synchronization signals.

The circuit assemblies shown in FIG. 1 operate under the control and synchronization of a central control circuit (not illustrated) formed for example by a microprocessor which receives both the radar video signals and the antenna rotation signals.

FIG. 2 is a partial block diagram of a digital image converter (DSC) in which provision is made for a block memory.

In this figure, there are again shown the radial memory 10, the coordinate conversion circuit assembly 3, the persistence circuit assembly 2 and the image memory 4 of FIG. 1.

This block diagram is provided in addition with a block memory 8 interposed between the radial memory 10 and the persistence circuit assembly 2. As mentioned earlier, the function of said block memory is to store the video signals as these latter are being received and as the conversions of corresponding coordinates are being performed. The structure of said block memory is generally similar to that of the image memory 4 and so designed that blocks corresponding to adjacent pixel areas can be transmitted in parallel to the image memory 4 via the persistence circuits 2.

In this embodiment, the DSC also includes addressing circuits 9 determining the x and y coordinates of the successive points of the radials delivered by the circuit assembly 3:

the write addresses of the block memory 8, that is to say determining the number of the block which is being written;

the read addresses of the same block memory;

the address in the range memory at which the block which is being read from the block memory is to be written.

Furthermore, as mentioned earlier, one of the reasons for access overloading of the image memory arises from the fact that a single pixel is addressed several times by a number of successive radials during a single antenna revolution in the zones located in the vicinity of the radar center. One of the advantages of insertion of the block memory 8 is avoiding the need for multiple accesses to the image memory 4 in respect of a single pixel. This is achieved by regrouping in the block memory incident data corresponding to one and the same pixel prior to any transfer to the image memory. To this end, the incident radials originating from the radial memory 10 pass through a regrouping circuit 11 before reaching the block memory 8. As it receives each point of the incident radial, the regrouping circuit 11 receives at the same time any information which may already have been stored in the block memory in respect of the pixel considered. Regrouping of these data including both incident information and previously stored information is performed by means of a maximum function for example. This regrouped video information be written into the block memory instead of the incident radial.

FIG. 3 is a diagram explaining the chosen correspondence between the blocks of the block memory 8 and the blocks of the image memory 4.

FIG. 3 shows a reference frame of orthonormal coordinates x,y having the radar center $C_R$ as its origin. Starting from the radar center, the zone covered by the radar is divided into square or rectangular areas disposed in an ordered array of rows and columns and each area contains the same number of pixels. By way of example, the following description will be based on square area each containing $A^2$ pixels. The sides of these areas are respectively parallel to the x and y axes. It will be postulated that the television screen (designated by the reference 7 in FIG. 1) is made up of $(N.A)^2$ pixels or in other words $N^2$ areas. It will therefore be necessary to ensure that the image memory 4 has a capacity of $(N.A)^2$ words each composed of p bits if p is the number of bits assigned to each pixel. As will also be noted, that portion of the zone which is covered by the radar beam and displayed on the screen is not necessarily centered on the radar center $C_R$.

FIG. 3 also shows in dashed outline a set of "lozenges" designated by the references $L_O, L_I \ldots L_i \ldots L_N \ldots$, of center $C_R$, in which the first lozenge ($L_O$)

coincides with the origin $C_R$. It may be considered that the different areas of FIG. 3 form concentric lozenges $L_O \ldots L_N$, the different areas being each joined to its lozenge at one corner or vertex of the area. The areas are designated hereinafter by the number of the lozenge to which they belong, this number being followed alternately by an index A or B for the reasons explained below. The areas of the screen correspond to blocks of bits in memory which will be designated by the same reference for the sake of enhanced simplicity.

There is also shown in FIG. 3 a radial line $R_j$ which is inclined to the axis y at an angle $\theta_j$.

As stated earlier, a block corresponding to an area traversed by a radial line $R_j$ (for example the area $L_{iB}$ 31 in the figure) must be transferred to the image memory only when the radials no longer pass through the area $L_{iB}$. This is verified as soon as the angle $\theta_j$ reaches the adjacent area at 45° in a downward direction on the right in the case of the first quadrant for example. Specifically, when the radial reaches the area element $L_{iA}$ (32 in the figure) which is adjacent thereto on the same lozenge ($L_i$). In a block memory, the first entry into the following block ($L_{iA}$) can therefore initiate reading of the previous block ($L_{iB}$) of one and the same lozenge ($L_i$).

Moreover, when the contents of the block being read (for example the block $L_{iB}$) are wholly transferred to the image memory 4, the block just mentioned may be re-used for another area. The area selected is precisely the area (33) in which writing initiates reading of the block $L_{iA}$ (32). In accordance with the invention, the blocks of the block memory 8 are therefore grouped together in pairs (index A, index B). Each pair is assigned to a separate lozenge ($L_i$). One of the blocks of the pair (the block $L_{iA}$, for example) is read in parallel and written to the image memory 4 while the other block ($L_{iB}$) receives incident information. The blocks are employed in alternate sequence for reconstituting the different areas of one and the same lozenge. In accordance with conventional practice, in the case of an angle $\theta_j$ which is positive and in the vicinity of zero (just to the right of the upper half of the y axis), the blocks are of the A type. In consequence, the type (A or B) of a write block is solely a function of x.

The maximum number of lozenges which can pass through a screen having a length of side equal to N box elements is equal to 2N−2. As shown in the foregoing, the block memory 8 must contain two blocks in respect of each lozenge, thus needing a minimum number of blocks for the block memory 8, namely 4N−4 which can be approximated to 4N.

It is apparent that the size of the block memory 8 is therefore considerably smaller than that of the image memory 4 ($N^2$ blocks).

In regard to the size of the area (each area being made up of $A^2$ pixels), the choice of size is the result of a compromise between different parameters.

In the first place, the size of the block memory 8 in pixels is equal to $B = 4N \times A^2$. If E designates the dimension of one side of the screen (again in pixels), we have $N = E/A$, hence $B = 4EA$. The size of the block memory 8 therefore increases in proportion to A or in other words in proportion to the size of the area.

Moreover, in order to have the possibility of transferring the $A^2$ pixels in parallel from the block memory 8 to the image memory 4 in a single image memory access, the image memory 4 must be provided as a rule with $A^2$ independently addressable modules.

These two aspects lead to limiting the size of the pixel box elements.

Furthermore, since the blocks are transmitted to the image memory only when they have been completely filled, there thus arises a delay in visual display which is a function of the size of the areas (and increases with the size of these areas). The delay in respect of a given size, is a function of the distance from the area to the radar center (the delay attains a maximum value in the vicinity of the radar center). This delay also makes it necessary to limit the size of the areas. However, in order to minimize the limitation just mentioned, two solutions are possible. The first solution is to divide the blocks into sub-blocks and, in zones located in the vicinity of the radar center, to apply the read-write process described earlier to the sub-blocks and not to the blocks. The second solution is to employ a plurality of separate and distinct block memories each provided with blocks of different size and relating to a particular region of the screen. The size of the blocks decreases towards the radar center. For the sake of simplicity, the screen regions are accordingly formed by nested squares centered on $C_R$. The final image is then formed in the image memory by employing the principle of inlays as will be explained below. The second solution has higher efficiency than the first but calls for a greater number of memory modules.

On the contrary, since the number of addresses of the blocks is equal to 4N and therefore inversely proportional to the length of the sides (A) of the areas, it is found necessary to avoid excessive size reduction of these areas in order to limit the number of addresses.

In the same order of ideas, it should further be mentioned that blocks of unduly small size limit the possibilities of displacement off-center of the portion being displayed. In practice, images which are highly off-center are formed of portions of radials which are very distant from each other. Correct operation of the process described in the foregoing needs to ensure that all the pixel box elements are traversed by at least one radial, which is no longer the case when the distance between two radials becomes too great with respect to the side A of the area, that is to say in practice in the vicinity of A.

FIG. 4 illustrates one embodiment of the DSC in accordance with the invention.

In this figure, there are again shown the elements of FIG. 2, namely the radial memory 10, the regrouping circuit 11, the block memory 8, the coordinate conversion circuit assembly 3 and the addressing assembly 9.

The block diagram of FIG. 4 also includes a set of "first-in, first-out" (FIFO) buffer memories. One buffer memory 21 is interposed on the video signal path between the block memory 8 and the persistence circuits 2 and the other buffer memory 22 is interposed on the address path between the assembly 9 and the image memory 4.

In fact, as has been mentioned earlier, the image memory 4 is read in accordance with cycles imposed by the television-mode display. This memory also has to be subjected to refreshment cycles and, in the time that remains, it can permit writing of blocks from the block memory 8. It is therefore the image memory 4 which sets its own writing rate. However, the organization of the method of storage in blocks described above does not take the requirements of the image memory 4 into account. It is therefore necessary to provide buffer memories. Thus, as stated earlier, when writing of one block of the memory 8 is completed, the contents of this memory are read into the FIFO memory 21 and stored therein while awaiting transfer to the image memory 4 via the persistence circuits 2 when the image memory 4 is available. The same applies to the addresses which are generated in accordance with a procedure described below.

The addressing assembly 9 includes a first circuit designated by the reference 91 which performs write-addressing and read-addressing of the blocks of the memory 8 by means of the coordinates x and y supplied by the coordinate conversion circuit assembly 3. As has already been seen earlier (in connection with FIG. 3), the block memory 8 must have a minimum of two separate portions or units (two modules) in which one unit contains type-A blocks and the other unit contains type-B blocks. In each of these modules, the address of one block is the same and is constituted by the number (L) of the lozenge to which it belongs. This number is given by the following expression:

$$L = X + Y$$

with:
$X = x/A$
$Y = y/A$ where x and y are the coordinates of a point as expressed with respect to the radar center $C_R$ and A is the number of pixels of each side of one block. X and Y therefore express the coordinates of a block with respect to $C_R$ or more specifically the coordinates of a characteristic point of said block known as a base point, namely the point corresponding to the vertex located on the lozenge to which it belongs. The circuit 91 therefore performs a computation of the expression L.

In an alternative embodiment, and in view of the fact that the maximum number of lozenges which passes through a square screen of $N^2$ areas is equal to $2N-2$, it is possible to express the address of the area modulo 2N for the sake of simplification, in which case the address in the block memory will be:

$$L = X + Y \pmod{2N}$$

The circuit 91 further delivers a bit designated as $L_A/L_B$ and having the value of 1 for example when the system carries out writing in a type-A block and having a value O when it carries out writing in a type-B block. This bit is addressed in particular to the block memory 8 in order to validate the writing and reading orders alternately for the modules containing the type-A blocks and type-B blocks respectively.

The addressing assembly 9 further includes a circuit 93 which also receives the x and y coordinates or only the low-weight bits of these latter and supplies the address in the block of each pixel to be stored for transmission by the memory 8.

The transmission of a block from the block memory 8 to the image memory 4 via the buffer memories 20 consists of the following operations:

Transmission of the video information of each of the $A^2$ pixels of the block. This transmission takes place in parallel to obtain an advantage from the organized structure of the blocks at the level of the image memory.

Transmission of the coordinates of the block considered in the TV screen. This computation is performed by a circuit 92 of the addressing assembly 9.

To this end, the circuit 92 receives the preceding x and y coordinates as well as the coordinates of the center of the screen $C_e$ with respect to the radar center $C_R$ and the information relating to the quadrant to which the block being read belongs. The circuit 92 then computes the coordinates $X_{exc}$, $Y_{exc}$ of the block considered in the screen as expressed with respect to the screen center $C_e$. By way of example, we have for the first quadrant:

$$X_{exc} = X_E - 1 - x_e$$

$$Y_{exc} = Y_E + 1 - y_e$$

where ($X_E$, $Y_E$) are coordinates of the base point of the block being written with respect to the radar center and ($x_e$, $y_e$) are coordinates of the screen center $C_e$. The same procedure is carried out in the case of the other quadrants. When passing the coordinate axes, we have for example in the case of the positive portion of the x axis:

$$X_{exc} = X_E - x_e$$

$$Y_{exc} = -y_e$$

The same applies to the passage of the other coordinate axes.

However, although the foregoing arrangement offers the advantage of simplicity, such an arrangement is possible only if the quadrant has been taken into account when writing the video signals into the blocks. If this condition has not been satisfied, rotation of the blocks being read is necessary prior to transmission to the image memory. In a preferred embodiment, the quadrant is therefore taken into account for writing the video signals into the blocks. This is achieved at the level of the circuit 93 which accordingly receives the quadrant information Q.

In FIG. 4, there is also shown a circuit 12 for timing control of the block memory 8. This circuit controls computation of the screen coordinates by the circuit 92, alternate writing and reading in the two modules of the block memory 8 as well as writing in the FIFO memories 20 via a circuit 14 which is described hereinafter.

Finally, there is also illustrated in FIG. 4 a circuit 13 for timing control of the image memory 4 which, apart from control of writing and reading of the image memory, also controls reading of the FIFO memories 21 and 22.

The timing circuits 12 and 13 are conventionally designed by means of clocks and logic circuits and synchronized by the microprocessor which controls the entire DSC.

There has been described in the foregoing the regrouping of video signals which correspond to one and the same pixel. This regrouping operation requires a comparison of incident video information and the video information stored in the block memory 8 if, and only if, this operation is not the first write operation relating to the pixel under consideration. Should this actually be the first write operation, then the operation omits any comparison. To this end, two solutions are possible. Either the fact that a first write operation has been performed is stored in memory in the case of each pixel, thus calling for storage means. Or else each block is reset to zero after reading of this latter. The solution just mentioned, as represented schematically by the block 14 of FIG. 4, is described hereinafter with reference to FIG. 5.

The circuit 14 includes a memory 23 which is addressed by the circuit 91 (address L) and contains the bit $L_A/L_B$ with respect to each lozenge. This bit is also delivered to said memory 23 by the circuit 91 of FIG. 4.

At each pulse delivered by the timing circuit 12, the contents of the memory 23 with respect to the lozenge considered is read, whereupon the new value of the bit $L_A/L_B$ is written into said memory. The incident value $L_A/L_B$ as well as the stored value of the same bit are sent to two logic circuits 24 and 25. When these two bits are different, which means that the incident video information is written into a new block ($L_B$, for example), the circuit 25 transmits a control signal to the block memory 8 in order to ensure that the block corresponding to the address L is read and addressed to the FIFO memories 20. Said control signal is further transmitted to FIFO memories 20 in order to ensure that these latter receive in writing the contents of the memory 8 which are being read. On the contrary, when the bits $L_A/L_B$ are equal, which means that the incident video information is still written in the same block (block $L_A$ in the previous example), reading of the block $L_B$ having already been performed, the block $L_B$ is reset to zero. To this end, the circuit 24 delivers a zero-reset signal to the block memory 8.

FIG. 6 represents one embodiment of the coordinate conversion circuit assembly 3 of the previous figures.

This circuit assembly produces cartesian coordinates (x and y) from the angle $\theta_j$ made by the radar beam with the reference direction (north). The principle employed is that of accumulation: starting for example from the point which is nearest the radar center $C_R$ and the coordinates of which are delivered to the block 3 ("init." input), the coordinates of each point of one and the same radial are computed successively.

Two methods are known: sine-cosine accumulation and tangent accumulation. The method of tangent accumulation is described hereinafter by way of example. In this case, a distinction has to be drawn between a value of the angle $\theta_j$ which is lower than or higher than $\pi/4$ in the first quadrant, and symmetrically in the others:

if $0 < \theta \leq 45°$, the increment at y between $I_{i-1}$ and $I_i$ is assumed to be equal to unity, in which case we have:

$$I_i \begin{cases} x_i = x_{i-1} + \tan \theta \\ y_i = y_{i-1} + 1 \end{cases} \quad (1)$$

if $45° < \theta < 90°$, the increment at x between $I_{i-1}$ and $I_i$ is assumed to be equal to unity, in which case we have:

$$I_i \begin{cases} x_i = x_{i-1} + 1 \\ y_i = y_{i-1} + \tan\left(\frac{\pi}{2} - \theta\right) \end{cases} \quad (2)$$

To this end, the circuit assembly 3 has the following components:

A table 33 giving the different values of the tangents of each of the angles $\theta_j$ which define respectively the radials. This table is preferably constituted by a memory addressed for example by the successive values ($\theta_j$) of the angle $\theta$.

A first accumulator 35 calculating the coordinate which is to be subjected to an accumulation in tan $\theta$ or in other words x in one half-quadrant and y in the other half-quadrant of one and the same quadrant (cf. expressions (1) and (2) given above). This coordinate is designated by V. To this end, the accumulator 35 receives from the table 33 the value tan $\theta_j$ as well as the initialization value, that is to say the coordinate (denoted by $V_o$) of the first point of the displayed radial. The accumulator 35 is constituted by an adder 42 surrounded by an input register 41 which receives the value of tan $\theta_j$ with respect to each radial, and an output register 43. The register 43 receives the initial coordinate $V_o$. The output of register 43 on the one hand delivers the running coordinate V which runs along the radial during the accumulations and, on the other hand, is also directed to the adder 42.

A second accumulator 34 having the function of establishing the other coordinate denoted U which is to be subjected to an accumulation equal to +1, that is to say y within the first half-quadrant and x within the second half-quadrant of the first quadrant. Said second accumulator can consist simply of a counter which receives as an initial value the coordinate ($U_o$) of the first point of the radial.

A circuit assembly 36 for receiving the coordinates U and V established by the accumulators 34 and 35 as well as the information of the half-quadrant to which the angle $\theta_j$ considered belongs, thus enabling said assembly to establish the cartesian coordinates (x and y) of the points of the radial with respect to the radar center $C_R$.

As mentioned earlier, the circuit assembly 3 shown in FIG. 6 is controlled and synchronized by the control device of the DSC which ensures in particular accumulation control operations and delivery of initial values.

FIG. 7 is a general diagram of the DSC in accordance with the invention. With respect to FIG. 4, the system illustrated here provides a number of alternative arrangements which can be carried into effect independently of each other.

In FIG. 7, there are again shown the different elements of FIG. 4, namely as follows:

The regrouping circuit assembly 11.
The block memory 8 subdivided into two modules 81 and 82 which contain respectively the type-A blocks and the type-B blocks.
The addressing circuit assembly 9.
The FIFO memory assembly 20.
The timing circuits 12 and 13.

It is worthy of note that the coordinates received by the circuit assembly 9 are no longer x and y but U and V, determination of the first from the second being integrated in this case with the circuit assembly 9.

INLAYS

To the preceding elements has been added a zone memory 15.

This memory is employed whenever it is desired to form "inlays" on the screen. The term "inlay" designates a portion of the radar coverage zone which may or may not form part of the image displayed on the screen and is enlarged with respect to this image. This possibility is employed, for example, when the operator desires to examine a specific detail. The zone memory 15 receives the coordinates of the write-state block as well as an indication of belonging or non-belonging to the image of the read-state block to be displayed (arrow 150 originating from the DSC control device).

Furthermore, an AND-circuit 16 is interposed in the read control of the block memory 8 and write control of the FIFO memories 20, these controls being derived from the timing circuit assembly 12. One input of said AND-gate 16 is connected to the output of the zone memory 15. In consequence, a block which can be read from the block memory 8 can in fact be read into the FIFO memories only if it is identified by the zone memory 15 as belonging to the image to be finally displayed.

It should lastly be mentioned that, in order to form a number of m inlays on the screen, provision must necessarily be made for m additional circuits such as the circuit 92, switching of these circuits being also carried out by the control device of the DSC (arrow 151).

It must be noted that a zone memory is necessary even in the absence of any inlay when the image displayed on the screen constitutes only part of the radar coverage zone, thereby making it possible in like manner to determine whether a block to be read in the block memory 8 should or should not be included in the image formed on the screen.

HOMOGENIZATION OF THE IMAGE

The diagram of FIG. 7 has also been modified with respect to the diagram of FIG. 4 so as to permit homogenization of the image by the process known as "pixel filling".

It is recalled that, when the process of coordinate conversion and/or display is quantized as is the case in a digital scan converter, it can happen that the conversion results in the appearance of dark spots in a bright zone, particularly in zones remote from the radar center. This "moth-eaten" appearance of the image is corrected by "filling" the dark spots, namely by giving them a nonzero brightness level.

In accordance with the invention, this filling operation is carried out at the level of the video information received in polar coordinates by forming fictitious radials between the real radials and assigning to each fictitious radial a video signal which is a function of the video signal of the adjacent real radials and preferably the video signal of those points of said adjacent real radials which are located at the same module as the fictitious point. These fictitious radials are then converted to cartesian coordinates and accordingly fill the pixels which were not previously reached.

Apart from the circuits which are specific to generation and conversion of fictitious radials, a filling function as has just been mentioned makes it necessary in addition to the arrangement shown in FIG. 4 to provide for duplication of the regrouping circuit 11. FIG. 7 shows within the circuit assembly 11 a first block 111 which is assigned to regrouping of the real video information ($I_R$) and a second block 112 which receives on the one hand (as in the case of the previous block) the video information stored in the block memory 8 but which receives on the other hand no longer the incident real video information but the video information produced by the filling function designated as $I_F$. The regrouped video information, whether this information is derived from the real radials or from the fictitious filling radials, is directed as before to the block memory 8 for storage.

However, in order to permit simultaneous processing of the real radials and of the fictitious radials, and inasmuch as the video signals to be written have to be present in different modules at a given instant, it may be found necessary to subdivide the block memory 8 into a plurality of modules having a smaller capacity and arranged in diagonal lines.

Moreover, a block must be transferred to the image memory 4 via the FIFO memories 20 only if the real radials and the fictitious filling radials have left said image memory. Verification of this condition is carried out by a comparison circuit 17 which receives the coordinates established by the coordinate conversion system in respect of the different real and fictitious radials and which either delivers or does not deliver a transfer permission order to the AND-circuit 16 according to the result of the comparison. More precisely, in the event that the coordinates are computed by the tangent accumulation method described earlier, it is found that the real radial and the fictitious radial have an identical coordinate, namely the coordinate U which is independent of the polar angle $\theta$. It is then only necessary to make a comparison between the coordinate $V_R$ of the real radial and the coordinate $V_F$ of the fictitious radial and more precisely one of the bits of this coordinate in order to determine whether the two points considered do or do not form part of one and the same block. This is achieved by the circuit 17 which is a logic circuit and the result of the comparison is designated by the notation $L_R = L_F$.

This information $L_R = L_F$ is also transmitted to the circuit assembly 14 for zero-resetting of the blocks of the memory 8 in order to inhibit writing of the information $L_A/L_B$ in the memory 23 when the radials $I_F$ and $I_R$ do not belong to the same pixel box element. In this case, reading of the block in the memory 8 has in fact been inhibited and it is necessary to ensure correlative inhibition of zero-resetting of the block concerned.

The advantage of this configuration is the lightness of application of the filling function which, in particular, does not increase the number of blocks to be transmitted to the image memory although the number of radials has increased.

The procedure described in the foregoing is necessary whenever it is desired to perform "synchronous filling" or in other words when the real radials and the fictitious radials are transmitted simultaneously to the image memory.

On the contrary, when the radials, whether real or fictitious, are transmitted to the image memory in succession ("asynchronous filling"), duplication of the regrouping function (11) and the comparison circuit (17) are not necessary.

REGULATION OF BLOCK FLOW

The output flow rate from the blocks of the block memory 8 towards the image memory, possibly via the FIFO memories 20, is unequal from one radial to another. For example, when the angle $\theta$ is close to 90°, the radial which follows the axis x initiates reading of all the blocks situated on the other side of this axis, whereas the following radials will not reach new blocks and so will not cause reading. The problem is similar at 45° and may exist for other unusual angles.

With the maximum information flow rate at the input of the image memory being fixed, the output flow rate peaks of the block memory 8 lead then either to considerable dimensioning of the FIFO memories 20 or to a high performance image memory which may accommodate these peaks.

According to the invention, the block flow rate between block memory 8 and FIFO memory 20 is regulated by introducing an additional condition to enable reading of the block memory: this condition consists in prohibiting reading of some blocks along certain radials.

In the method above described, it is necessary to have two successive writing operations in the same block so that reading of the other block of the pair considered then resetting thereof may be ensured successively. The fact of having a minimum of two writing operations in a given block leads to the existence of a minimum number of radials passing through the corresponding pixel area and, consequently, to a minimum distance between two radials. These different minima are illustrated in FIGS. 8a and 8b.

In FIG. 8a, an area B has been shown and two successive radials referenced $R_{i-1}$ and $R_i$. The area B has passing therethrough the single radial $R_i$. On each of these radials have been shown a number of points reached by the conversion. Among these, there are $P_1$, belonging to the radial $R_{i-1}$, which is the closest point to area B but outside this latter and points $P_2$ and $P_3$, belonging to the radial $R_i$, which are the only ones to belong to area B. FIG. 8a shows then the minimum case.

In this Figure, there has also been shown by $\theta$ the angle which the radial $R_i$ forms with the axis x, by $\alpha$ the angle which the segment $P_1P_2$ forms with axis y, by $d\alpha$ the length of the segment $P_1P_2$, that is to say the length of the segment taken through the angle $\alpha$ which separates two radials, by d the distance between the radials $R_{i-1}$ and $R_i$ and by dx the distance, expressed as a number of points, separating two points of the same abscissa for two successive radials, in this case point $P_1$ from point $P_4$ of the radial $R_i$. If we designate by A, the side of the area B, expressed in points, a maximum value $d\alpha_M$ may be expressed for $d\alpha$ which may separate the points of two successive radials so that two points at least fall in the same area B:

$$d\alpha_M = \frac{A}{\cos \alpha} \quad (11)$$

Angle $\alpha$ is therefore defined by the size of the blocks and by the minimum number of points in the same area so that reading of the corresponding block is possible.

In the particular case where A=4 points and where the minimum number of points is 2, $\alpha$ is such that: tan $\alpha$=0.5.

Referring to FIG. 8a, distance $d\alpha$ is expressed by:

$$d\alpha = \frac{d}{\cos(\theta - \alpha)}$$

We have:

$$d = \rho \cdot \epsilon \frac{x}{\cos \theta} \cdot \epsilon \quad (12)$$

where $\epsilon$ is the angle separating two consecutive radials whence $$d\alpha = \frac{x \cdot \epsilon}{\cos \theta \cdot \cos(\theta - \alpha)} \quad (13)$$

The distance $d\alpha$ must then be less than the limit distance $d\alpha_M$.

However, if $d\alpha$ is less than $d\alpha_M/2$, it is apparent that reading of the blocks would be possible with half as many radials. According to the invention, a first group of blocks available for reading is read in a first step, then a second group formed of the remaining blocks in a second step. In practice, reading of some blocks is prohibited on half the radials which pass through the block, for example the uneven half: they will then only be transferred and reset on the even radials. Concurrently, reading of the other blocks is prohibited on the even radials so as to only allow reading on the uneven radials. Preferably, the distribution of the blocks to be read between even radials and uneven radials is closely related or equal. This type of zone where $d\alpha$ is less than $d\alpha_M/2$ is called zone 2.

The zone where the distance $d\alpha$ is between $d\alpha_M$ and $d\alpha_M/2$ is called zone 1.

More generally, if $d\alpha$ is less than $d\alpha_M/N$, reading of the blocks would be possible with N times less radials: only $1/N^{th}$ of the blocks available on each of the radials is then read. The corresponding zone is called zone N.

We thus obtain zones of rank i (with $1 \leq i \leq N$) where only one radial out of i initiates reading of a given block. The number of blocks transmissible to the FIFO memory by radial then becomes, for zone i:

$$B_i = \frac{B_A}{i} [X_i^S - X_i^I]$$

where $X_i^S$ and $X_i^I$ are the limit abscissa expressed as pixels (X=x/A), respectively upper and lower, of the zone i and $B_A$ is the maximum number of blocks likely to be read in A writing operations.

The number $B_A$ depends on the distance dx, which is given by:

$$ds = \frac{d}{\cos \theta}$$

By replacing d by its above expression (12), we have:

$$dx = \frac{x \cdot \epsilon}{\cos^2 \theta} \quad (14)$$

It can be shown that, for a calculation of coordinates using the method of tangent accumulations, $B_1=1$ if dx<A and $B_A=2$ if dx$\geq$A.

More generally, for the zone of rank i, the critical value of the distance dx becomes A/i, which gives:

. for $dx < \frac{4}{i}$, $B_A = 1$

. for $dx \geq \frac{4}{1}$, $B_A = 2$

For each radial of each image, the maximum flow rate at the output of the block memory 8, in number of blocks per radial, is given by:

$$C = \text{MAX} \left\{ \sum_i \left[ \frac{1}{i} \cdot (X_{i1}^S - X_{i1}^I) + \frac{2}{i} \cdot (X_{i2}^S - X_{i2}^I) \right] \right\}$$

where:

MAX means that for determining C the value between brackets is calculated for each of the radials and for C the maximum of the values thus obtained is chosen.

i is the rank zone.

$X_{i1}^S$ is the upper abscissa (expressed as pixels) of the zone i with $B_A=1$.

$X_{i1}^I$ is the lower abscissa (expressed as pixels) of the zone i with $B_A=1$.

$X_{i2}^S$ is the upper abscissa (expressed as pixels) of the zone i with $B_A=2$.

$X_{i2}^I$ is the lower abscissa (expressed as pixels) of zone i with $B_A=2$.

Knowledge of this maximum value C allows optimized dimensioning of the circuits and of the interconnection buses.

FIG. 8b is similar to FIG. 8a but in the case where homogenization of the image is provided by pixel filling and described above.

The pixel filling illustrated in FIG. 8b is synchronous with rank 2, that is to say that a fictitious filling radial ($F_{i-1}$, $F_i$) is created between two real consecutive radials ($R_{i-1}$, $R_i$).

In this case, it is necessary for two points ($P_2$ and $P_3$) of a real radial ($R_i$) to belong to the area 3 at the same time as two points ($P_6$ and $P_7$) of the corresponding fictitious radial ($F_i$).

The minimum case is shown in FIG. 8b where the radial having the point ($P_1$) the closest to area B, but outside this latter, is a fictitious radial of the preceding rank ($F_{i-1}$).

It is apparent that the distance dα is here ⅔ of what it is in the case of FIG. 8a and, similarly, the maximum value $(d\alpha_M)_F$ in the case of filling radials is given by:

$$(d\alpha_M)_F = \frac{2}{3} \cdot d\alpha_M = \frac{2}{3} \cdot \frac{A}{\cos \alpha} \qquad (15)$$

The values of $B_A$ are not modified by the existence of fictitious filling radials.

FIG. 9 shows zone 1, with and without filling as well as the limit of the sub zones $B_A=1$ and $B_A=2$, in the form of cartesian coordinates (x, y), the angle θ being indicated as a parameter and the origin of the x's being the radar center $C_R$.

This diagram shows a first curve $dx_1$, corresponding to $dx=A$, for which value the number $B_A$ passes from 1 to 2 for zone 1.

A second curve has been shown referenced $d\alpha_M$, which represents the variation of the above expression (13) in the case where $d\alpha = d\alpha_M$ (expression 11)), a limit value after which the above described method no longer functions.

A third curve has been shown referenced $d\alpha_M/2$, which illustrates the value separating zones 1 and 2.

Zone 1 is therefore included between curves $d\alpha_M$ and $d\alpha_M/2$ in the absence of fictitious filling radials, with a flow rate which is doubled once the curve $dx_1$ has been crossed (in the direction of the increasing x's).

Finally two curves have been shown in FIG. 9, referenced respectively $(d\alpha_M)_F$, which is the limit value in the case where filling radials exist, and $(d\alpha_M)_F/2$ which represents the value separating zones 1 and 2 in this case.

It should be noted that, considering for example curve $d\alpha_M$, there exists a particular point P on this curve, for $\theta = \alpha$, which:

is situated at the same abscissa as for $\theta=0$, as the above expression (13) shows (segment 1);

is situated on the same lozenge as for $\theta=45°$ (segment 2).

Consequently, to generate the limits of zones 1, 2 ... i ... N for reading the blocks, an approximation is used similar to that of curve $d\alpha_M$ by means of segments 1 and 2:

segment 1 defined by $x=C^{te}=A/\epsilon$ for $0 \leq \theta \leq \alpha$.

segment 2 defined by a lozenge number $L=X+\nu$ with the preceding notations for $\alpha \leq \theta \leq 45°$.

This approximation has the further advantage of being situated short of the curve while remaining close. We have then for the limit of zone i:

for $0 \leq \theta \leq \alpha$: $x = \frac{1}{2} \cdot A/\epsilon$;

for $\alpha \leq \theta \leq 45°$: lozenge number. It is mentioned above that the lozenge number L is given by:

$$L = X + Y$$

with:

$$X = x/A$$

$$Y = y/1 = X \cdot \tan \theta.$$

For the limit of zone i, we obtain:
$$L = \tfrac{1}{2} \cdot l / i \cdot l / \epsilon$$

The definition of the segments similar to segments 1 and 2 is obtained by symmetries for the other values of θ.

FIG. 10 illustrates one example of cutting up the range of the radar into five zones, with i=1, 2, 3 4 and 6, and the following numerical application:

8192 real radials;

An image formed of 1024 lines each of 1024 pixels.

Square areas of A=4 pixels per side with tan α=0.5.

Creation of fictitious radials for a pixel filling of rank 2.

The different zones are limited by curves, referenced 3 to 7, corresponding as mentioned above to the approximation of the following values of dα:

4/cos α, which is the value $d\alpha_M$.

2/cos α, which is the value $d\alpha_M/2$, defining zone 2.

4/3·cos α, which is the value $d\alpha_M/3$, defining zone 3.

1/cos α, which is the value $d\alpha_M/3$, defining zone 4.

2/3·cos α, which is the value $d\alpha_M/6$, defining zone 6.

In FIG. 10 five zones have been illustrated but this number may be larger or smaller, the only practical limit to its increase being the fact that the radials are counted modulo the PPCM of the zone numbers for initiating reading of the associated blocks.

There is also shown in this Figure the abscissa X, expressed as a number of pixels, of these different curves for $\theta = 0$ as well as the number of the corresponding lozenge.

FIGS. 11a and 11b illustrate the method of reading the blocks in two cases given by way of examples.

In FIG. 11a has been shown the reading of the blocks of a zone 2 on two successive radials, $R_i$ and $R_{i+1}$.

On the same radial, $R_i$ for example, the reading of the block or blocks corresponding to a part $P_1$ (shown with a thick line) of this radial is allowed whereas a following part, referenced $I_1$ is prohibited. Symmetrically, the reading of the blocks available for reading is prohibited during a part $I_3$ of the following radial $R_{i+1}$, the part $I_3$ belonging to the part $P_1$. Similarly, this reading is allowed during a part P₃ of the radial $R_{i+1}$, corresponding to the part $I_1$.

An alternation of allowed (p₂) and prohibited (I₂) parts has been similarly shown for the radial $R_i$, corresponding to respectively prohibited (I₄) and allowed (p₄) parts of the radial $R_{i+1}$.

Thus, the blocks of zone 2 are all read but reading thereof is divided over two radials.

Furthermore, as was mentioned above, the allowed and prohibited parts are preferably equal and alternate at maximum. Their length may be of a few areas or even, preferably, of a single area.

FIG. 11b shows similarly, the reading of the blocks of a zone 3 on three successive radials, $R_i$, $R_{i+1}$, $R_{i+2}$.

The parts where the reading is allowed are referenced $p_1$ to $p_6$ and are divided successively over the three radials, the other parts ($I_{10}$, $I_{11}$, $I_{20}$ and $I_{21}$ for radial $R_i$) being prohibited.

FIG. 7 further comprises a circuit 18 for regulating the flow rate of the blocks.

For this, circuit 18 receives the coordinates U, the lozenge number (L) elaborated by the addressing assembly 9 and the angle increment ε, coming from the control device of the DSC.

Circuit 18 defines the limits of the zones as mentioned above from the lozenge number and from the abscissa x and, depending on the position of the block considered in a given zone, allows (or not) reading thereof by a signal (AUTOR.BLOC) fed to the AND gate 16.

In the case where the reading of a block is not allowed, circuit 18 prevents resetting thereof by sending an inhibition signal (INHIB.) to the circuit 14 for resetting the blocks.

FIG. 12 shows one embodiment of the block 18 of the preceding Figure.

It includes:

A first logic circuit 181, for example of the PAL (Programmable Array Logic) type receiving the lozenge number L and delivering the zone limit for $\theta > \alpha$, that is to say segment 2 mentioned above. Circuit 181 further receives a validation signal (VALID.) when the angle θ is greater than α, coming from the control device of the DSC.

A second logic circuit 182, for example also of the PAL type, receiving the coordinate U and delivering the zone limit for $\theta < \alpha$, that is to say segment 1. Circuit 182 also receives a validation signal from the control device of the DSC but when the angle θ is less than α.

A counter 183, relooped on itself, receiving the angle increment ε and the value of the PPCM delivered by the control device of the DSC, and delivering the number of each radial modulo the PPCM.

A memory 184, for example of PROM type, receiving the magnitudes delivered by the preceding blocks (181, 182 and 183) as well as the lozenge number of each of the areas.

Depending on whether the area considered belongs or not to a zone and a radial such that the corresponding block may be read, memory 184 delivers a reading enabling signal to the AND gate 16 (FIG. 7) or a reset inhibition signal to circuit 14 (FIG. 7).

The signals from the control device of the DSC (VALID.; PPCM) are shown schematically by control 180 in FIG. 7.

What is claimed is:

1. A method for optimizing the storage of video signals in a digital scan converter, the video signals being supplied in polar orientation in the form of a succession of radials so as to form an image, said digital scan converter comprising: a television-scan screen on which at least part of said video signals are represented; at least one radial memory with an analog to digital converter for successive storage of the radials in digital form and output of corresponding digital video signals; a conversion assembly for conversion of polar coordinates into cartesian coordinates; an image memory with an organization which is identical with that of said television-scan screen for storing said digital video signals; a block memory interposed between said radial memory and said image memory;

said method comprising the following steps:

organizing said block memory in the same manner as said image memory and divided into blocks, each block of said block memory corresponding to an area of adjacent points on said television-scan screen, the blocks being grouped together in pairs, the pairs of blocks being assigned respectively to theoretical lozenges, the theoretical lozenges comprising concentric lozenges formed by all the areas of the screen, applying said video signals to said radial memory for analog to digital conversion and storage and supplying polar coordinate information to said conversion assembly for conversion into cartesian coordinates, transmitting said digital video signals from said radial memory to said block memory and writing said digital signals to said block memory progressively as the coordinates of each point of a radial are converted into cartesian coordinates by said conversion assembly, the first writing operation to a block of said block memory initiating reading of the second block of the pair, and reading and transmitting to said image memory contents of one block of each of said pair of blocks of said block memory in parallel while the other block of the same pair is written with said digital video signals.

2. A method as recited in claim 1 wherein prior to writing a point in a block of said block memory with a digital video signal from said radial memory a regrouping step is effected, said regrouping step generating information for writing to said point by recalling, from said block, information previously written for said point and generating said information to be written using said recalled information and said digital video signal from said radial memory.

3. A method according to claim 2, wherein said information to be written is derived by applying a maximum function to said digital video signal from said radial memory and said recalled information.

4. A method according to claim 1, wherein a second writing operation in a given book initiates zero-resetting of that block of a pair of blocks including said given block.

5. A method according to claim 4, wherein, for zones of the image in which an area includes at least two radials, each having at least two points inside said area, reading of corresponding blocks is divided up by inhibiting reading of certain blocks during certain writing operations.

6. A method according to claim 5,
   wherein, in said zones, the distribution of the inhibitions is such that the alternation of blocks with prohibited or permitted reading is maximum.

7. A method according to claim 5, wherein the inhibition of certain blocks is effected for some radials and is not effected for other radials.

8. A method according to claim 7, wherein N zones are defined, a zone of rank i, with $1 \leq i \leq N$, being characterized by a distance $d\alpha$ less than $d\alpha_M/i$, where:

$d\alpha$ is a distance separating two radials, which distance is taken at an angle $\alpha$, the angle being defined by its tangent, which is given by the ratio of the number of points required, namely two, to the side A of the area, expressed as pixels where:

$d\alpha_M = A/\cos \alpha$ and only one radial out of i radials initiates reading of a given block in the zone of rank i.

9. A method according to claim 8, wherein a curve limiting the zone i includes a first part, for $0 \leq \Theta \leq \alpha$ where $\Theta$ is the polar angle, which is a straight line segment defined by a constant abscissa x and equal to $1/i \cdot A/\Sigma$, where $\Sigma$ is the angle made by two successive radials, and a second part, for $\alpha \leq \Theta \leq 45°$, which is a lozenge fraction, given by $3/2i\Sigma$.

10. A method according to claim 8, wherein each of the zones includes two sub zones defined by the curve given by the expression:

$$dx = A = \frac{x \cdot \epsilon}{\cos^2 \theta}.$$

11. A method according to claim 1, wherein the address of a block in said block memory is constituted by the number of order L of the lozenge to which it belongs, said number being formed from the coordinates x and y of one of the vertices of the block as follows:

$L = X + Y$ with:
$X = x/A$
$Y = y/A$
where A is the number of points per side of said area.

12. A digital scan converter responsive to video signals supplied in polar orientation in the form of a succession of radials so as to form an image on a television-scan screen, said digital scan converter comprising:
a television-scan screen on which at least part of said video signals are represented;
at least one radial memory with an analog to digital converter for successive storage of the radials in digital form and output of corresponding digital video signals;
a conversion assembly for conversion of polar coordinates into cartesian coordinates, means for supplying polar coordinate information to said conversion assembly as said video signals are applied to said radial memory,
an image memory with an organization which is identical with that of said television-scan screen for storing said digital video signals;
a block memory interposed between said radial memory and said image memory; said block memory organized in the same manner as said image memory and divided into blocks, each block of said block memory corresponding to an area of adjacent points on said television-scan screen, the blocks being grouped together in pairs, the pairs of blocks being assigned respectively to theoretical lozenges, the theoretical lozenges comprising concentric lozenges formed by all the areas of the screen,
means for transmitting said digital video signals from said radial memory to said block memory and writing said digital signals to said block memory progressively as the coordinates of each point of a radial are converted into cartesian coordinates by said conversion assembly, said means for transmitting including means responsive to the first writing operation to a block of said block memory for initiating reading of the second block of the same pair, and
means for reading and transmitting to said image memory one block of each of said pair of blocks of said block memory in parallel while the other block of the same pair is written with said digital video signals.

13. A digital scan converter as recited in claim 12 and further comprising:
an addressing circuit responsive to cartesian coordinate information from said conversion assembly, said addressing circuit including first means for computing an address of a block in said block memory, second means for computing an identification of a point in an area corresponding to said block, and third means for computing television-scan screen coordinates corresponding to that block in said block memory being read.

14. A digital scan converter according to claim 12 wherein said digital scan converter further comprises two first-in-first-out (FIFO) type buffer-memory assemblies, one of said FIFO-type assemblies being provided for the digital video signals and the second of said FIFO assemblies being provided for address signals, one of said FIFO assemblies being interposed between said block memory and said image memory and another of said FIFO assemblies being interposed between said conversion assembly and said image memory.

15. A digital scan converter according to claim 12, wherein said digital scan converter further comprises means for producing fictitious radials for homogenizing by filling and image formed on said television-scan screen, means for regrouping the fictitious radials with the contents of said block memory and comparison means for determining whether points of a fictitious radial belong or do not belong to the same area as points of the previous real radial.

16. A digital scan converter according to claim 12, wherein said digital scan converter further comprises means for zero-resetting the contents of blocks of said block memory.

17. A digital scan converter according to claim 12, wherein said digital scan converter further comprises a zone memory for determining whether a block being read in said block memory belongs or does not belong to an image to be displayed on said television-scan screen.

* * * * *